United States Patent Office 3,721,702
Patented Mar. 20, 1973

3,721,702
PROCESS FOR PREPARING DIETHYL 3,4-DI-ALKOXYANILINOMETHYLENEMALONATES
Nicholas D. Harris, Norwich, N.Y., assignor to Morton-Norwich Products, Inc.
No Drawing. Filed July 22, 1968, Ser. No. 746,247
Int. Cl. C07c 101/20
U.S. Cl. 260—471 A         1 Claim

ABSTRACT OF THE DISCLOSURE

Dialkyl anilinomethylenemalonates, useful as intermediates via cyclization to form useful hypotensives and coccidiostats, are prepared by displacement of the dimethylamino group of diethyl dimethylaminomethylenemalonate with an aniline.

---

This invention relates to a process for preparing dialkyl anilinomethylenemalonates which are useful intermediates in the preparation of pharmaceutically valuable agents; e.g., U.S. Pat. No. 3,178,348 discloses such malonates in the preparation of hypotensive agents and U.S. Pat. No. 3,290,315 discloses their use in preparing coccidiostats.

In the past, dialkyl anilinomethylenemalonates have been most often secured through the reaction of an aniline and a dialkyl alkoxymethylenemalonate. The latter reagent is economically expensive. Any substitute synthetic route avoiding it is a welcome addition to those concerned with the manufacture of the aforementioned hypotensives and coccidiostats.

It has been discovered that dialkyl anilinomethylenemalonates may be readily and simply prepared by a method which involves readily and cheaply available reagents.

In accordance with this invention diethyl dimethylaminomethylenemalonate, prepared according to the scheme set forth by Bredereck et al. [Ber. 94, 2278 (1961)] or by chemically obvious variants thereof, and the selected aniline are brought together in the presence of acid for a time period sufficient to allow completion of their interaction and the product thereof taken up in a solvent which is washed with base, then acid, and finally water, followed by removal of solvent. The residue from that treatment is dissolved in a solvent having minimal solubility therefor from which the desired dialkyl anilinomethylenemalonate is precipitated by cooling or by reducing solvent volume.

The process of this invention is exemplified in the following general terms:

A solution of equimolar parts of an aniline and diethyl dimethylaminomethylenemalonate in acetic acid is allowed to stand for a period of about 8–10 hours. Excess solvent is removed and the residue taken up in ether which is washed with sodium bicarbonate solution, then 5% aqueous hydrochloric acid, and finally water. The ether is removed and the residue dissolved in ethanol from which a solid product is recovered by cooling or by removing a portion of the solvent.

When the aniline in the above example is 4-aminoveratrole, the solid product is diethyl 3,4-dimethoxyanilinomethylenemalonate of melting point 55–57°; when the aniline is 3,4-diethoxyaniline, the solid product is diethyl 3,4-diethoxyanilinomethylenemalonate of melting point 65–67°; and when the aniline is 3,4-diisobutoxyaniline, the solid product is diethyl 3,4-diisobutoxyanilinomethylenemalonate of melting point 77–79°.

What is claimed is:
1. The method of preparing diethyl 3,4-dialkoxyanilinomethylenemalonates which comprises bringing together equimolar amounts of diethyl dimethylaminomethylenemalonate and a 3,4-dialkoxyaniline in the presence of acetic acid as a solvent.

References Cited

UNITED STATES PATENTS 3,463,779    8/1969    Bowie et al. _____ 260—471

OTHER REFERENCES

Houben-Weyl, Stickstoff-Verbindungen II, Band XI/1, QD258H7 (1957), p. 249, reaction C relied on.

LORRAINE A. WEINBERGER, Primary Examiner
L. A. THAXTON, Assistant Examiner

U.S. Cl. X.R.
260—999